United States Patent
Kim et al.

(10) Patent No.: US 9,938,433 B2
(45) Date of Patent: Apr. 10, 2018

(54) ACRYLIC FOAM ADHESIVE TAPE AND FLAT-PANEL DISPLAY APPLYING SAME

(71) Applicant: LG Chem, Ltd., Seoul (KR)

(72) Inventors: Ji Hye Kim, Bucheon-si (KR); Joon Seung Lee, Ulsan (KR); Byoung Hun Ahn, Ulsan (KR); Jang Soon Kim, Seongnam-si (KR); Ae-Jung Jang, Anyang-si (KR); Jae Hwang Lee, Ulsan (KR)

(73) Assignee: LG Chem, Ltd. (KR)

( * ) Notice: Subject to any disclaimer, the term of this patent is extended or adjusted under 35 U.S.C. 154(b) by 49 days.

(21) Appl. No.: 14/786,531

(22) PCT Filed: Apr. 16, 2014

(86) PCT No.: PCT/KR2014/003323
§ 371 (c)(1),
(2) Date: Oct. 22, 2015

(87) PCT Pub. No.: WO2014/181976
PCT Pub. Date: Nov. 13, 2014

(65) Prior Publication Data
US 2016/0068715 A1 Mar. 10, 2016

(30) Foreign Application Priority Data

May 7, 2013 (KR) .................. 10-2013-0051317

(51) Int. Cl.
| C09J 7/02 | (2006.01) |
| H04N 5/645 | (2006.01) |
| B32B 17/06 | (2006.01) |
| B32B 27/06 | (2006.01) |
| B32B 5/18 | (2006.01) |
| B32B 7/12 | (2006.01) |
| C09J 133/04 | (2006.01) |

(52) U.S. Cl.
CPC .............. *C09J 7/0289* (2013.01); *B32B 5/18* (2013.01); *B32B 7/12* (2013.01); *B32B 17/066* (2013.01); *B32B 27/065* (2013.01); *C09J 7/0217* (2013.01); *C09J 133/04* (2013.01); *H04N 5/645* (2013.01); *B32B 2250/03* (2013.01); *B32B 2255/26* (2013.01); *B32B 2262/101* (2013.01); *B32B 2262/106* (2013.01); *B32B 2264/02* (2013.01); *B32B 2266/0242* (2013.01); *B32B 2457/20* (2013.01); *C09J 2433/006* (2013.01)

(58) Field of Classification Search
CPC ........ C09J 7/0289; B32B 5/18; B32B 17/066; B32B 27/065; B32B 7/12
See application file for complete search history.

(56) References Cited

U.S. PATENT DOCUMENTS

| 9,339,993 B2 * | 5/2016 | Cites ...................... B32B 17/00 |
| 2002/0028326 A1 | 3/2002 | Lhila et al. |
| 2004/0082700 A1 * | 4/2004 | Khandpur ................. B32B 5/18 524/474 |
| 2005/0276963 A1 * | 12/2005 | Kim ...................... C09J 7/0217 428/304.4 |
| 2006/0125364 A1 | 6/2006 | Takeda et al. |
| 2010/0215947 A1 * | 8/2010 | Yamanaka ................. C09J 4/00 428/323 |
| 2011/0315316 A1 | 12/2011 | Welke et al. |
| 2013/0011672 A1 | 1/2013 | Okamoto et al. |

FOREIGN PATENT DOCUMENTS

| CN | 102822292 A | 12/2012 | |
| EP | 2226369 A1 | 9/2010 | |
| EP | 2557135 A2 | 2/2013 | |
| JP | 2004069766 A | 3/2004 | |
| JP | 2009120807 A | 6/2009 | |
| JP | 2012519750 A | 8/2012 | |
| KR | 100210735 B1 | 7/1999 | |
| KR | 1020080003890 A | 1/2008 | |
| KR | 1020130039064 A | 4/2013 | |
| TW | 200834153 A | 8/2008 | |
| WO | WO 2012037094 A2 * | 3/2012 | ....... B32B 17/10036 |

OTHER PUBLICATIONS

International Search Report for PCT/KR2014/003323 dated Jul. 25, 2014.
European Search Report dated Jun. 29, 2016 corresponding to European Patent Application No. 14794782.4.

* cited by examiner

*Primary Examiner* — Hai Vo
(74) *Attorney, Agent, or Firm* — Lerner, David, Littenberg, Krumholz & Mentlik, LLP

(57) ABSTRACT

Provided is an acrylic foam adhesive tape including: an acrylic foam layer formed by curing a composition for forming an acrylic foam layer; and an adhesive layer being in contact with one surface of the acrylic foam layer, wherein shear strength of the acrylic foam layer is 5 kg/cm² to 15 kg/cm².

14 Claims, No Drawings

ACRYLIC FOAM ADHESIVE TAPE AND FLAT-PANEL DISPLAY APPLYING SAME

CROSS REFERNECE TO RELATED APPLICATION

This application claims the priority of Korean Patent Application No. 10-2013-0051317, filed on May 7, 2013 in the KIPO (Korean Intellectual Property Office). Further, this application is the National Phase application of International Application No. PCT/ KR2014/003323 filed Apr. 16, 2014, which designates the United States and was published in Korean.

TECHNICAL FIELD

The present invention relates to an acrylic foam adhesive tape and a flat panel display applying same.

BACKGROUND ART

A foam tape has been widely used for bonding components of electronic products to each other, for adhering embedded products or automotive interior and exterior materials to kitchen furniture for interior, including sink, and the like. In particular, the foam tape has been mainly attached onto a coating surface coated on a glass or a film to decorate appearance.

In general, the foam tape is manufactured by constituting foam, forming various kinds of adhesive layers depending on usage, and then laminating the foam and the adhesive layers.

DISCLOSURE

Technical Problem

An aspect of the present invention is to provide to an acrylic foam adhesive tape having improved adhesion force to materials having low surface energy.

Another aspect of the present invention is to provide to a flat panel display to which the acrylic foam adhesive tape is applied.

Technical Solution

In accordance with one aspect of the present invention, an acrylic foam adhesive tape includes: an acrylic foam layer formed by curing a composition for forming an acrylic foam layer; and an adhesive layer being in contact with one surface of the acrylic foam layer, wherein shear strength of the acrylic foam layer is about 5 kg/cm² to about 15 kg/cm².

Only one adhesive layer may be formed on one surface of the acrylic foam adhesive tape.

The composition for forming an acrylic foam layer may be a composition including a (meth)acrylic acid ester-based monomer, a polar functional group-containing monomer, and a photo-cross-linking agent, or may include a polymerized compound of the (meth)acrylic acid ester-based monomer, the polar functional group-containing monomer, and the photo-cross-linking agent polymerized by photo polymerization, thermal polymerization, or dual polymerization of photo polymerization and thermal polymerization.

A weight ratio of the (meth)acrylic acid ester-based monomer and the polar functional group-containing monomer may be about 90:10 to about 70:30.

The (meth)acrylic acid ester-based monomer may include at least one selected from the group consisting of butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, acrylamide, acrylonitrile, and combinations thereof.

The polar functional group-containing monomer may include at lease one selected from the group consisting of a hydroxyl group-containing monomer, a carboxyl group-containing monomer, a nitrogen-containing monomer, and combinations thereof.

The photo-cross-linking agent may be a multifunctional diacrylate-based cross-linking agent.

A content of the photo-cross-linking agent may be about 0.05 to about 5 parts by weight relative to 100 parts by weight of sum of the (meth)acrylic acid ester-based monomer and the polar functional group-containing monomer.

The composition for forming an acrylic foam layer further includes a hollow polymeric microsphere to form the acrylic foam layer by forming foam simultaneously with the composition being cured.

The hollow polymeric microsphere may be a particle where gas that is present in a gaseous state at room temperature is filled in a polymer shell.

The shell of the hollow polymeric microsphere may include at least one polymer selected from the group consisting of an acrylic polymer, a vinylidene chloride-based polymer, a styrene-based polymer, and combinations thereof.

The acrylic foam layer may have a thickness of about 50 μm to about 2 mm.

The adhesive layer may be formed by curing an acrylic adhesive composition including an acrylic resin.

The adhesive layer may have a thickness of about 30 μm to about 80 μm.

The acrylic foam adhesive tape may further include a primer layer to improve interfacial adhesion force of the adhesive layer and the acrylic foam layer.

The adhesive layer may be corona treated or plasma treated to improve interfacial adhesion force of the adhesive layer and the acrylic foam layer.

In accordance with another aspect of the present invention, there is provided a flat panel display formed by attaching a glass panel, the acrylic foam adhesive tape, and a back cover in sequence, wherein the acrylic foam adhesive tape is interposed between the glass panel and the back cover so that an acrylic foam layer of the acrylic foam adhesive tape is in contact with the glass panel, and an adhesive layer of the acrylic foam adhesive tape is in contact with the back cover.

The back cover may be formed of carbon fiber reinforced plastic (CFRP) or glass fiber reinforced plastic (GFRP).

Advantageous Effects

The acrylic foam adhesive tape according to the present invention may have improved adhesion force to materials having low surface energy.

BEST MODE

Hereinafter, exemplary embodiments of the present invention will be described in detail. However, the following examples are only provided as one embodiment of the present invention, and the present invention is not limited to the following Examples.

In an exemplary embodiment of the present invention, there is provided an acrylic foam adhesive tape including: an acrylic foam layer formed by curing a composition for forming an acrylic foam layer; and an adhesive layer being in contact with one surface of the acrylic foam layer, wherein shear strength of the acrylic foam layer is 5 kg/cm$^2$ to 15 kg/cm$^2$.

The acrylic foam adhesive tape may be used as a mediator attaching a glass panel and a back cover of a flat panel display such as TV, or the like, thereby absorbing and buffering vibration and noise, and increasing heat transfer efficiency.

When a material of the back cover is a composite material such as carbon fiber reinforced plastic (CFRP), glass fiber reinforced plastic (GFRP), or the like, much stronger adhesion force of the acrylic foam adhesive tape is required, and accordingly, the acrylic foam adhesive tape having improved adhesion force according to the present invention is effectively applicable.

The back cover of the composite material such as carbon fiber reinforced plastic (CFRP), glass fiber reinforced plastic (GFRP), or the like, is generally formed of a hard polymer to have low surface energy. The acrylic foam adhesive tape may have improved adhesion force even to the material having low surface energy.

For example, the acrylic foam adhesive tape may exert improved adhesion force on surfaces of materials having surface energy of about 30 mN/m to about 50 mN/m.

The acrylic foam adhesive tape may have only one adhesive layer formed on one surface thereof.

The acrylic foam adhesive tape is formed by including the acrylic foam layer and the adhesive layer as described above, wherein shear strength of the acrylic foam layer is 5 kg/cm$^2$ to 15 kg/cm$^2$, the acrylic foam layer is attached onto the glass panel, and the adhesive layer is attached onto the back cover, thereby obtaining an effect in which adhesion force is maximized.

The acrylic foam layer of the acrylic foam adhesive tape is controlled to have shear strength in the above-described range, thereby maximizing adhesion force, and implementing excellent adhesion force even when the back cover attached to the adhesive layer is a material having surface energy of about 30 mN/m to about 50 mN/m.

In an exemplary embodiment of the present invention, the acrylic foam adhesive tape may have shear strength of about 7 kg/cm$^2$ to about 10 kg/cm$^2$.

The acrylic foam may be manufactured by curing an acrylic photo-curable resin composition while simultaneously forming foam.

The curing may be performed by photo curing, or dual curing with both of photo curing and thermal curing. The acrylic foam may be manufactured by methods known in the art, and the methods of manufacturing the acrylic foam are not specifically limited.

The acrylic foam is not specifically limited in view of thickness, but for example, may have a thickness of about 50 µm to about 2 mm. The acrylic foam has the thickness in the above-described range, such that the thickness may not be excessively increased, and stress relieving effect and appropriate thermal resistance and impact resistance may be provided so that two substrates having different thermal expansion rate and being adhered onto both surfaces of the acrylic foam adhesive tape are not damaged, and attachment area may be secured.

The acrylic foam adhesive tape is manufactured by including the adhesive layer and the acrylic foam having adhesion property into an adhesive tape.

Specifically, the acrylic foam layer may have the following constitution to satisfy high shear strength in the above-described range.

The composition for forming the acrylic foam layer may be a composition including known additives such as a (meth)acrylic acid ester-based monomer, a polar functional group-containing monomer, a photo-cross-linking agent, and the like, or may include a polymerized compound of the (meth)acrylic acid ester-based monomer and the polar functional group-containing monomer polymerized by photo polymerization, thermal polymerization, or dual polymerization of photo polymerization and thermal polymerization.

The (meth)acrylic acid ester-based monomer may serve to increase adhesion force and cohesion force of the foam tape. For example, the (meth)acrylic acid ester-based monomer may include butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, acrylamide, acrylonitrile, or combinations thereof.

The polar functional group-containing monomer may be copolymerized with the (meth)acrylic acid ester-based monomer, and may includes polar functional groups to control durability and cohesion force of the acrylic foam adhesive tape. Examples of the polar functional group-containing monomer may include a hydroxyl group-containing monomer, a carboxyl group-containing monomer, a nitrogen-containing monomer, and the like, or combinations thereof.

Examples of the hydroxyl group-containing monomer may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethylene glycol(meth)acrylate or 2-hydroxy propylene glycol(meth)acrylate. Examples of the carboxyl group-containing monomer may include (meth)acrylic acid, 2-(meth)acryloyloxy acetic acid, 3-(meth)acryloyloxy propyl acid, 4-(meth)acryloyloxy butyric acid, acrylic acid dimer, itaconic acid, maleic acid and maleic anhydride. Examples of the nitrogen-containing monomer may include (methacrylamide, N-vinyl pyrrolidone, and N-vinyl caprolactam, but the present invention is not limited to these examples.

In an exemplary embodiment of the present invention, the polar functional group-containing monomer may be an acrylic acid.

A weight ratio of the (meth)acrylic acid ester-based monomer and the polar functional group-containing monomer may be about 90:10 to about 70:30. The composition for forming the acrylic foam layer has the above-described content ratio, such that cohesion force of the acrylic foam layer may be improved to implement shear strength in the above-described range.

Adhesion property of the acrylic foam may be controlled by the photo-cross-linking agent included in the acrylic photo-curable resin composition.

A specific example of the photo-cross-linking agent may be multifunctional acrylate. More specifically, examples of the photo-cross-linking agent may include cross-linking monomers such as 1,6-hexanediol diacrylate, trimethylolpropane triacrylate, pentaerythritol triacrylate, 1,2-ethylene glycol diacrylate, 1,12-dodecanediol acrylate, and the like, but the present invention is not limited to these examples of the photo-cross-linking agent.

The photo-cross-linking agent may have a content of about 0.05 to about 5 parts by weight relative to 100 parts by weight of sum of the (meth)acrylic acid ester-based monomer and the polar functional group-containing monomer. The acrylic photo-curable resin composition includes the photo-cross-linking agent having the above-described range of content, thereby securing excellent thermal resistance, and further securing a predetermined attachment area by controlling a solid degree.

The acrylic photo-curable resin composition may form foam by methods known in the art.

For example, the acrylic photo-curable resin composition may further include a hollow polymeric microsphere to form the foam.

The hollow polymeric microsphere means a particle filled in which gas that is present in a gaseous state at room temperature is filled in a spherical polymer shell. The hollow polymeric microsphere may be included in the acrylic photo-curable resin composition to be used, and does not rupture under conditions of general manufacturing processes of sheets having adhesion property, such as coating and thermal curing or photo-curing. However, when the resin composition is heat treated under a predetermined condition, for example, at a predetermined temperature or more, hollow polymeric microsphere which is ruptured due to high gas pressure in the sphere and instable spherical shape, may be used.

Gas in the microsphere is not specifically limited as long as the gas is present in a gaseous state at room temperature. For example, the gas may be nitrogen, carbon dioxide, pentane, butane, and the like, specifically, pentane, butane, and the like, having relatively high molecular weight.

A material of the shell of the hollow polymeric microsphere is not limited, but may be selected to embody the acrylic foam layer having the above-described range of shear strength. For example, by using the hollow polymeric microsphere having a shell made of a relatively soft material, the foam layer having low hardness and improved wetting property may be formed, as compared to a case of using a relatively hard material. The acrylic foam layer having an improved wetting property while simultaneously having relatively low hardness as described above is formed, and as a result, the acrylic foam layer having the above-described numerical range of shear strength, that is, about 5 kg/cm$^2$ to about 15 kg/cm$^2$, may be manufactured.

For example, the shell of the hollow polymeric microsphere may include at least one polymer selected from the group consisting of an acrylic polymer, a styrene-based polymer, and combinations thereof. Specifically, the acrylic polymer may be used in view of compatibility with the acrylic polymer adhesive composition.

A diameter of the hollow polymeric microsphere is not specifically limited, but may be about 1 to about 350 µm. When the particle diameter is smaller than about 1 µm, an effect that the acrylic foam layer is flexible may be reduced. When the particle diameter is larger than about 350 µm, a surface of the acrylic foam layer is excessively rough at the time of significantly rupturing the hollow polymeric microsphere, such that wettability is poor and thermal conductivity is reduced, which is not preferable. In addition, the acrylic photo-curable resin composition may be used by mixing two or more of hollow polymeric microspheres having different particle diameters.

The reason is because when the hollow polymeric microspheres having different sizes are mixed, flexibility of the acrylic foam layer may be further improved by filling small particles among large particles.

The shell of the hollow polymeric microsphere preferably has a thickness of about 0.01 to 1 µm. When the thickness of the hollow polymeric microsphere is less than about 0.01 µm, the hollow polymeric microsphere is very easily ruptured. In addition, when the thickness is larger than about 1 µm, it is difficult to determine conditions for rupturing the hollow polymeric microsphere, and heat treatment time at a high temperature is increased if the rupturing is performed by heat treatment, such that the cured acrylic polymer may be deteriorated, which may reduce durability reliability of the acrylic foam layer.

A density of the hollow polymeric microsphere is not specifically limited, but may be about 0.01 to about 0.5 g/cm$^3$. When the density is smaller than about 0.01 g/cm$^3$, the hollow polymeric microsphere transferred to be incorporated into the polymer resin is easily scattered, such that it is difficult to accurately control desirable content. Further, when the density is larger than about 0.5 g/cm$^3$, the density of the acrylic foam layer may be increased, which is not preferred.

The content of the hollow polymeric microsphere may be about 0.1 to about 10 parts by weight, specifically, about 0.5 to about 2 parts by weight relative to 100 parts by weight of sum of the (meth)acrylic acid ester-based monomer and the polar functional group-containing monomer. When the foam is formed by appropriately including the hollow polymeric microsphere, cushion property is provided to the acrylic foam layer while simultaneously having a weight lightening effect. However, when the hollow polymeric microsphere is excessively used, adhesion physical properties are deteriorated, and processability is reduced due to excessively high viscosity of slurry before curing, which is not preferred.

The composition for forming the acrylic foam layer may further include a thermally conductive filler, and the thermally conductive filler may be added to the (meth)acrylic acid ester-based monomer and the polar functional group-containing monomer, thereby providing flame retardancy. The reason is because the thermally conductive inorganic filler reduces the content of the copolymer capable of being burned, and changes thermal conductivity, physical properties, viscosity, and the like, of the copolymer. In addition, among the thermally conductive fillers, an inorganic-based thermally conductive filler may be used to produce $H_2O$ and $CO_2$ which are non-combustible materials due to endothermic reaction absorbing energy at the time of reacting with the copolymer, thereby exhibiting a physical retardant effect.

Further, the composition for forming the acrylic foam layer may further include the thermally conductive filler, such that the acrylic foam layer to be formed may have an improved wetting property while simultaneously having relatively low hardness. The acrylic foam layer having an improved wetting property while simultaneously having relatively low hardness as described above is formed, and as a result, the acrylic foam layer having the above-described numerical range of shear strength, that is, about 5 kg/cm$^2$ to about 15 kg/cm$^2$, may be manufactured.

The thermally conductive filler may have a content of about 50 parts by weight to about 300 parts by weight relative to 100 parts by weight of the (meth)acrylic acid ester-based monomer. The thermally conductive filler has the content in the above-described range, such that hardness of the composition for forming the acrylic foam layer may be increased, and accordingly, there is no possibility in which attachment area is reduced, and flame retardancy of the composition for forming the acrylic foam layer may be secured.

The thermally conductive filler may have an average particle diameter of about 1 µm to about 200 µm, specifically, about 10 µm to about 180 µm. The thermally conductive inorganic filler has the average particle diameter in the above-described range, such that there is no problem of increase in viscosity before the adhesive composition is cured, and flame retardancy may be maximized while inhibiting particle sedimentation during a curing process.

The thermally conductive inorganic filler may be at least one selected from the group consisting of metal oxide, metal hydroxide, metal nitride, metal carbide, metal boride, and combinations thereof. Specifically, the thermally conductive inorganic filler may include aluminum oxide, magnesium oxide, zinc oxide, silicon carbide, aluminum nitride, boron nitride, silicon nitride, aluminum hydroxide, magnesium hydroxide, silicon oxide, and the like.

More specifically, when aluminum hydroxide or magnesium hydroxide is used as the thermally conductive inorganic filler, smoke generation amount at the time of combusting the adhesive composition is excessively small, which is advantageous in view of environmental aspect, and excellent flame retardancy may be secured. The aluminum hydroxide has a low decomposition temperature of about 200° C., such that the aluminum hydroxide is appropriate when a processing temperature of the adhesive composition is low. When the processing temperature is high, magnesium hydroxide having a relatively high decomposition temperature of about 320° C. may be used. Further, when the magnesium hydroxide is a nano-sized particle, excellent flame retardancy may be secured even though the addition content is small.

The composition for forming the acrylic foam layer may further include a radical initiator, and the radical initiator may be used for polymerization of the (meth)acrylic acid ester-based monomer, specifically, may be a photoinitiator. Specific examples of the photoinitiator may include benzoin methyl ether, benzoin isopropyl ether, anisoin methyl ether, benzoin, benzyl ketal, and the like.

The composition for forming the acrylic foam layer may further include a surfactant, wherein the surfactant may be a silicone-based surfactant, and the like. The composition for forming the acrylic foam layer may include the above-described surfactant, thereby contributing to bubble stability in manufacturing the acrylic foam.

In addition thereto, the acrylic photo-curable resin composition may further include at least one additive selected from the group consisting of a tackifier, a coupling agent, an antistatic agent, dye, pigment, sunscreen, antioxidant, processing oil, and combinations thereof.

The tackifier functions to increase initial adhesion property of the acrylic foam adhesive tape. As the tackifier, a rosin ester tackifier, a rosin-based tackifier, a terpene-based tackifier, a petroleum resin-based tackifier, and the like, or combinations thereof, may be used.

After the acrylic foam adhesive tape is used for attachment between materials to be adhered, the coupling agent has a function to promote cross-linking of an acrylic polymer configuring the substrate composition by heat, sunlight or temperature applied under ambient conditions, over a period of time, thereby forming a three dimensional network features to exhibit permanent adhesion force. As the coupling agent, a mixture of amine-based silane and epoxy silane may be used.

The antistatic agent has a function to prevent occurrence of static electricity in the adhered materials in which the acrylic foam adhesive tape is used. As the antistatic agent, antistatic agents known in the art may be used.

The processing oil may be added to improve cold resistance. The processing oil may include di-isobutyl phthalate (DIBP), di-octyl-phthalate (DOP), allyl ether-based, paraffin oil, naphthalene-based oil, and the like, but the present invention is not limited to these examples of the processing oil.

In the acrylic photo-curable resin composition, dye, pigment, sunscreen, antioxidant, and the like, may be further added within the range at which performance thereof is maintained, and contents thereof to be added may vary according to properties of a final product to be desired.

The acrylic foam adhesive tape may have a structure in which the adhesive layer is stacked on the acrylic foam layer, thereby having high adhesion force to materials having low surface energy.

The adhesive layer may be manufactured by applying an acrylic adhesive agent, a rubber-based adhesive agent, a silicone-based adhesive agent, or combinations thereof. Any adhesive agent known in the art may be used without limitation.

The adhesive layer may have a thickness of about 30 µm to about 80 µm.

The adhesive layer may be formed from the acrylic adhesive composition including an acrylic resin.

The adhesive layer may be formed by coating the acrylic adhesive composition on the acrylic foam layer, or may be formed by molding the acrylic adhesive composition into a film shape and then laminating the film on the acrylic foam layer.

When the adhesive layer is manufactured by molding the composition into the film shape and laminating the film on the acrylic foam layer, the adhesive layer may be corona treated and laminated on the acrylic foam layer. The corona treatment may be performed under known processing conditions.

The acrylic adhesive composition, which is a thermosetting and photo-curable (including UV-curable) resin composition, may generally have a composition for being usable for manufacturing a sheet having adhesion property.

For example, the adhesive layer may be formed by thermosetting the acrylic adhesive composition including a curing agent of about 0.005 to about 0.1 part by weight relative to 100 parts by weight of acrylic resin in which acrylate and acrylic acid are polymerized. The acrylic resin may be polymerized by using acrylic acid having a content of about 5 to about 25 parts by weight relative to 100 parts by weight of acrylate. The acrylic resin polymerized at the above-described content ratio may be used to provide excellent adhesion force to composite materials such as carbon fiber reinforced plastic (CFRP), glass fiber reinforced plastic (GFRP), and the like.

More specifically, the acrylic resin may be polymerized by using acrylic acid of about 10 to about 15 parts by weight relative to 100 parts by weight of acrylate.

When the adhesive layer is molded into a film shape or a sheet shape and then stacked on the acrylic foam layer, adhesion between the acrylic foam layer and the adhesive layer also needs to be excellent. That is, interfacial adhesion force between the acrylic foam layer and the adhesive layer needs to be secured.

In order to secure the interfacial adhesion force between the acrylic foam layer and the adhesive layer, a method of applying a primer between the acrylic foam layer and the adhesive layer may be considered.

Specifically, the primer may be commercially available TITE-R-Bond™ products from Saint-Gobain Application Engineering, such as 2287A, 2301A, 4300, 4357, 2684A, 4040, 4144, 4146, 2933A, 3249, 3303, 4070, and the like.

The adhesive layer is molded into a film shape or a sheet shape, and corona treated and stacked on the acrylic foam layer, thereby improving interfacial adhesion force between the acrylic foam layer and the adhesive layer.

For example, the corona treatment may be performed at current of about 0.1 to about 10 A and a treatment speed of about 0.5 to about 5 M/min (meter/minute). Here, in the corona treatment, when the current is less than about 0.1 A, or the treatment speed is less than about 0.5 M/min, an effect obtained by the corona treatment may not be sufficient, such that it may be difficult to provide excellent interfacial adhesion force, and when the current is more than about 10 A, or the treatment speed is more than about 0.5 M/min, modification and/or discoloration of the adhesive layer may occur.

In addition, according to an exemplary embodiment of the present invention, the adhesive layer may be corona treated as described above so as to have more excellent interfacial adhesion force with the acrylic foam layer, and then plasma treated, if needed.

In another exemplary embodiment of the present invention, there is provided a flat panel display formed by attaching a glass panel, the acrylic foam adhesive tape, and a back cover in sequence, wherein the acrylic foam adhesive tape is interposed between the glass panel and the back cover so that an acrylic foam layer of the acrylic foam adhesive tape is in contact with the glass panel, and an adhesive layer of the acrylic foam adhesive tape is in contact with the back cover.

A material of the back cover may be carbon fiber reinforced plastic (CFRP) or glass fiber reinforced plastic (GFRP).

Hereinafter, Examples and Comparative Examples of the present invention will be described. However, the following examples are only provided as one embodiment of the present invention, and the present invention is not limited to the following Examples.

EXAMPLE

Example 1

(1) Manufacture of Acrylic Foam Layer 87.5 parts by weight of 2-ethylhexyl acrylate and 12.5 parts by weight of acrylic acid as a polar monomer were thermally polymerized in 1 liter glass reactor to obtain an acrylic polymer having a viscosity of 4500 cP.

To 100 parts by weight of the obtained acrylic polymer, 0.2 part by weight of Irgacure-651 ($\alpha,\alpha$-methoxy-$\alpha$-hydroxy acetophenone) as a photoinitiator, 0.35 parts by weight of 1,6-hexanediol diacrylate (HDDA) as a photo-cross-linking agent were added, and sufficiently stirred. To the mixture, 0.5 part by weight of hollow polymeric microspheres (Expancel 092 DE 40 d30, AkzoNobel corporation) having an average particle diameter of 40 μm, and 0.5 part by weight of hollow polymeric microspheres (Expancel 092 DET 120 d30, AkzoNobel corporation) having an average particle diameter of 120 μm as hollow polymeric microspheres, and 100 parts by weight of aluminum hydroxide (H-100, Showa Denko Co., Ltd.) having an average particle diameter of 70 μm as a thermally conductive filler were added, and sufficiently stirred until the composition was uniform.

The obtained mixture was defoamed under reduced pressure using a vacuum pump, and coated with a thickness of 550 μm on a polyester release film using a knife coating. Here, after a polyester film was covered on the coated layer in order to block oxygen, curing was performed by irradiation for 3 minutes using a black fluorescent lamp. Then, the cured product was heated at 200° C. for 90 seconds to rupture the hollow polymeric microspheres, thereby obtaining an acrylic foam layer having a thickness of 0.55 mm.

(2) Manufacture of Adhesive Layer

To 100 parts by weight of 2-ethylhexyl acrylate, 10 parts by weight of acrylic acid as a polar monomer was solution-polymerized in 1 liter glass reactor, thereby preparing a syrup having a weight average molecular weight of about 1.5 million and having a solid content of 21 wt %. To 100 parts by weight of the prepared syrup, 0.01 parts by weight of an aziridine curing agent was added and sufficiently stirred. Then, the mixture was coated on a silicone release polyester (PET) film, and dried in an oven at 100° C. for 3 minutes to manufacture an acrylic adhesive layer having a thickness of 50 μm. In addition, aging was performed in an oven at 50° C. for 48 hours.

(3) Manufacture of Acrylic Foam Adhesive Tape

The manufactured adhesive layer was corona treated at current of 6 A and 2 M/min using a corona processor, and the acrylic adhesive layer was stacked on only one surface of the manufactured acrylic foam layer. That is, the adhesive layer was stacked on one surface of the acrylic foam layer.

In addition, the stacked sample was put into an oven at 50° C., followed by aging for 24 hours to be laminated, thereby manufacturing an acrylic foam tape including the adhesive layer (corona treated)+the acrylic foam layer.

Comparative Example 1

An acrylic foam adhesive tape in which the adhesive layer was not separately formed, was manufactured by the same method as Example 1 except for manufacturing an acrylic foam layer having the same thickness as total thickness of the acrylic foam adhesive tape of Example 1, that is, 0.6 mm.

Comparative Example 2

An acrylic foam adhesive tape having a thickness of 0.6 mm and including an acrylic foam layer manufactured as described below was manufactured.

95 parts by weight of 2-ethylhexyl acrylate and 5 parts by weight of acrylic acid as a polar monomer were thermally polymerized in 1 liter glass reactor to obtain an acrylic polymer having a viscosity of 4500 cP.

To 100 parts by weight of the obtained acrylic polymer, 0.2 part by weight of Irgacure-651 ($\alpha,\alpha$-methoxy-$\alpha$-hydroxy acetophenone) as a photoinitiator, 0.35 parts by weight of 1,6-hexanediol diacrylate (HDDA) as a photo-cross-linking agent were added, and sufficiently stirred. To the mixture, 0.5 part by weight of hollow polymeric microspheres (Expancel 092 DE 40 d30, AkzoNobel corporation) having an average particle diameter of 40 μm, and 0.5 part by weight of hollow polymeric microspheres (Expancel 092 DET 120 d30, AkzoNobel corporation) having an average particle diameter of 120 μm as hollow polymeric microspheres, and 100 parts by weight of aluminum hydroxide (H-100, Showa Denko Co., Ltd.) having an average particle diameter of 70 μm as a thermally conductive filler were added, and sufficiently stirred until the composition was uniform.

The obtained mixture was defoamed under reduced pressure using a vacuum pump, and coated with a thickness of 550 μm on a polyester release film using a knife coating. Here, after a polyester film was covered on the coated layer in order to block oxygen, curing was performed by irradiation for 3 minutes using a black fluorescent lamp. Then, the cured product was heated at 200 t for 90 seconds to rupture the hollow polymeric microspheres, thereby obtaining an acrylic foam layer.

Comparative Example 3

(1) Manufacture of Acrylic Foam Layer 89 parts by weight of 2-ethylhexyl acrylate and 11 parts by weight of acrylic acid as a polar monomer were thermally polymerized in 1 liter glass reactor to obtain an acrylic polymer having a viscosity of 3500 cP.

To 100 parts by weight of the obtained acrylic polymer, 0.2 part by weight of Irgacure-651 ($\alpha,\alpha$-methoxy-$\alpha$-hydroxy acetophenone) as a photoinitiator, 0.35 parts by weight of 1,6-hexanediol diacrylate (HDDA) as a photo-cross-linking agent were added, and sufficiently stirred. To the mixture, 0.5 parts by weight of glass bubbles (K-15, 3M Co., Ltd.) having an average particle diameter of 60 μm and 2 parts by weight of silica were mixed and sufficiently stirred.

The obtained mixture was defoamed under reduced pressure using a vacuum pump, and coated with a thickness of 550 μm on a polyester release film using a knife coating. Here, after a polyester film was covered on the coated layer in order to block oxygen, curing was performed by irradiation for 3 minutes using a black fluorescent lamp.

(2) Manufacture of Adhesive Layer

To 100 parts by weight of 2-ethylhexyl acrylate, 10 parts by weight of acrylic acid as a polar monomer was solution-polymerized in 1 liter glass reactor, thereby preparing a syrup having a weight average molecular weight of about 1.5 million and having a solid content of 21 wt %. To 100 parts by weight of the prepared syrup, 0.01 parts by weight of an aziridine curing agent was added and sufficiently stirred. Then, the mixture was coated on a silicone release polyester (PET) film, and dried in an oven at 100° C. for 3 minutes to manufacture an acrylic adhesive layer having a thickness of 50 μm. In addition, aging was performed in an oven at 50 t for 48 hours.

(3) Manufacture of Acrylic Foam Adhesive Tape

The manufactured adhesive layers was corona treated at current of 6 A and 2 M/min using a corona processor, and the acrylic adhesive layer was laminated on only one surface of the manufactured acrylic foam layer. That is, the adhesive layer was laminated on one surface of the acrylic foam layer. In addition, the stacked sample was put into an oven at 50° C., followed by aging for 24 hours to be laminated, thereby manufacturing an acrylic foam tape including the adhesive layer (corona treated)+the acrylic foam layer.

Evaluation

Experimental Example 1

Measurement of Shear Strength of Acrylic Foam Layer

With respect to the acrylic foam adhesive tapes of Example 1 and Comparative Examples 1 to 3, in Example 1 and Comparative Example 3, the acrylic foam layer was stacked being in contact with a glass panel, and the adhesive layer was stacked being in contact with a back cover formed of a CFRP material, and in Comparative Example 1 and 2, a glass panel and a back cover formed of a CFRP material were stacked being in contact with both surfaces of the acrylic foam layer, respectively. Then, the tapes were pressed with a load of 6 kg for 30 seconds, followed by aging for 15 minutes so as to be attached to each other. Further, dynamic shear strength was measured by pulling both sides of the substrate at a cross head speed of 12.7 m/min at 25° C., using a universal testing machine (UTM) in accordance with ASTM D 1002 standard.

Experimental Example 2

Evaluation of Peel Strength on Class Surface and Composite Material Surface

With respect to the acrylic foam adhesive tapes of Example 1 and Comparative Examples 1 to 3, in Example 1 and Comparative Example 3, the acrylic foam layer was stacked being in contact with a glass panel, and the adhesive layer was stacked being in contact with a back cover formed of a CFRP material, and in Comparative Example 1 and 2, a glass panel and a back cover formed of a CFRP material were stacked being in contact with both surfaces of the acrylic foam layer, respectively. Then, peel strength of each surface was measured using a universal testing machine (UTM) in accordance with ASTM D 1002 standard. Results thereof were shown in Table 1 below. An evaluation speed at the time of measuring peel strength was 300 mm/min.

Experimental Example 3

Evaluation Whether Detachment Occurs after High Temperature and High Humidity

With respect to the acrylic foam adhesive tapes of Example 1 and Comparative Examples 1 to 3, in Example 1 and Comparative Example 3, the acrylic foam layer was stacked being in contact with a glass panel, and the adhesive layer was stacked being in contact with a back cover formed of a CFRP material, and in Comparative Example 1 and 2, a glass panel and a back cover formed of a CFRP material were stacked being in contact with both surfaces of the acrylic foam layer, respectively, thereby manufacturing flat display panels of Example 1 and Comparative Examples 1 to 3. Then, each flat display panel was put into a chamber with 90% relative humidity at, and after 240 hours, visually observed whether detachment occurred at edge portions of the glass panel/acrylic foam adhesive tape/back cover. Results thereof were shown in Table 1 below.

TABLE 1

| Classification | Shear strength of acrylic foam layer [kg/cm$^2$] | Peel force to glass panel [g/in] | Peel force to back cover [g/in] | Whether detachment occurs after high temperature and high humidity |
|---|---|---|---|---|
| Example 1 | 8.96 | 650 | 3,200 | Detachment did not occur |
| Comparative Example 1 | 3.52 | 650 | 120 | Detached from the back cover |
| Comparative Example 2 | 2.5 | 220 | 200 | Detached from the back cover |
| Comparative Example 3 | 4.0 | 1,800 | 2,800 | Detached from the back cover |

As shown in Table 1 above, the acrylic foam adhesive tape of Example 1 had excellent adhesion force to the back cover of the composite material. It was confirmed that the acrylic foam layers of Comparative Examples 1 and 2 had low interfacial adhesion force to the back cover to have remarkably reduced shear strength as compared to that of Example 1. Comparative Example 3 had relatively improved shear strength as compared to Comparative Examples 1 and 2; however, did not still reach a predetermined shear strength level of 5 kg/cm² or more. In addition, as compared to Comparative Examples 1 and 2, Comparative Example 3 had improved shear strength to have high peel strength to the back cover; however, hardness was increased due to glass bubble, such that the adhesive tape of Comparative Example 3 was not stretched in shearing, and accordingly, detached after high temperature and high humidity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A flat panel display comprising:
a glass panel,
a permanent acrylic foam adhesive tape: and
a back cover attached in sequence,
wherein the acrylic foam adhesive tape comprises:
an acrylic foam layer formed by curing a composition for forming an acrylic foam layer; and an adhesive layer being in contact with one surface of the acrylic foam layer,
wherein the shear strength of the acrylic foam layer is 5 kg/cm² to 15 kg/cm²,
wherein the composition for forming the acrylic foam layer is
(a) a first composition including a (meth)acrylic acid ester-based monomer, a polar functional group-containing monomer, and a photo-cross-linking agent, or
(b) a second composition including a polymerized compound of the (meth)acrylic acid ester-based monomer, the polar functional group-containing monomer, and the photo-cross-linking agent, wherein the second composition including the polymerized compound is polymerized by photo polymerization, thermal polymerization, or dual polymerization of photo polymerization and thermal polymerization,
wherein the composition for forming an acrylic foam layer further includes a plurality of hollow polymeric microspheres to form the acrylic foam layer by forming foam simultaneously with the composition being cured,
wherein the hollow polymeric microspheres have two or more different diameters;
wherein the acrylic foam adhesive tape is interposed between the glass panel and the back cover so that the acrylic foam layer of the acrylic foam adhesive tape is in contact with the glass panel,
wherein the adhesive layer of the acrylic foam adhesive tape is in contact with the back cover, and
wherein the back cover is formed of carbon fiber reinforced plastic (CFRP) or glass fiber reinforced plastic (GFRP), and has a surface energy of 30 mN/m to 50 mN/m.

2. The flat panel display of claim 1, wherein only one adhesive layer is formed on one surface of the acrylic foam adhesive tape.

3. The flat panel display of claim 1, wherein a weight ratio of the (meth)acrylic acid ester-based monomer and the polar functional group-containing monomer is 90:10 to 70:30.

4. The flat panel display of claim 1, wherein the (meth)acrylic acid ester-based monomer includes at least one selected from butyl acrylate, butyl methacrylate, hexyl acrylate, hexyl methacrylate, n-octyl acrylate, n-octyl methacrylate, isooctyl acrylate, isooctyl methacrylate, 2-ethylhexyl acrylate, 2-ethylhexyl methacrylate, isononyl acrylate, isononyl methacrylate, acrylamide, acrylonitrile, or combinations thereof.

5. The flat panel display of claim 1, wherein the polar functional group-containing monomer includes at least one selected from a hydroxyl group-containing monomer, a carboxyl group-containing monomer, a nitrogen-containing monomer, or combinations thereof.

6. The flat panel display of claim 1, wherein the photo-cross-linking agent is a multifunctional diacrylate-based cross-linking agent.

7. The flat panel display of claim 1, wherein a content of the photo-cross-linking agent is 0.05 to 5 parts by weight relative to 100 parts by weight of sum of the (meth)acrylic acid ester-based monomer and the polar functional group-containing monomer.

8. The flat panel display of claim 1, wherein the plurality of hollow polymeric microspheres are particles where gas that is present in a gaseous state at room temperature is filled in a polymer shell.

9. The flat panel display of claim 1, wherein the shell of the hollow polymeric microsphere includes at least one polymer selected from an acrylic polymer, a vinylidene chloride-based polymer, a styrene-based polymer, or combinations thereof.

10. The flat panel display of claim 1, wherein the acrylic foam layer has a thickness of 50 μm to 2 mm.

11. The flat panel display of claim 1, wherein the adhesive layer is formed by curing an acrylic adhesive composition including an acrylic resin.

12. The flat panel display of claim 1, wherein the adhesive layer has a thickness of 30 μm to 80 μm.

13. The flat panel display of claim 1, further comprising a primer layer to improve interfacial adhesion force of the adhesive layer and the acrylic foam layer.

14. The flat panel display of claim 1, wherein the adhesive layer is corona treated or plasma treated to improve interfacial adhesion force of the adhesive layer and the acrylic foam layer.

* * * * *